US012688131B2

(12) United States Patent
Ignatowski et al.

(10) Patent No.: US 12,688,131 B2
(45) Date of Patent: Jul. 21, 2026

(54) MULTI-STACK COMPUTE CHIP AND MEMORY ARCHITECTURE

(71) Applicant: Advanced Micro Devices, Inc., Santa Clara, CA (US)

(72) Inventors: Michael Ignatowski, Austin, TX (US); Michael J. Schulte, Austin, TX (US); Gabriel Hsiuwei Loh, Bellevue, WA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 18/390,893

(22) Filed: Dec. 20, 2023

(65) Prior Publication Data

US 2024/0273040 A1      Aug. 15, 2024

Related U.S. Application Data

(60) Provisional application No. 63/484,183, filed on Feb. 9, 2023.

(51) Int. Cl.
| | |
|---|---|
| *G06F 3/06* | (2006.01) |
| *G06F 1/3234* | (2019.01) |
| *G06F 13/16* | (2006.01) |

(52) U.S. Cl.
CPC ........ *G06F 13/1684* (2013.01); *G06F 1/3275* (2013.01); *G06F 3/0604* (2013.01); *G06F 3/0625* (2013.01); *G06F 3/0646* (2013.01); *G06F 3/0685* (2013.01); *G06F 13/1694* (2013.01)

(58) Field of Classification Search
CPC ..... G06F 3/0625; G06F 3/0646; G06F 3/0685
See application file for complete search history.

(56) References Cited

U.S. PATENT DOCUMENTS

| | | | | |
|---|---|---|---|---|
| 8,397,013 | B1 * | 3/2013 | Rosenband | .............. G11C 5/02 |
| | | | | 711/111 |
| 2015/0199126 | A1 * | 7/2015 | Jayasena | ............. G06F 12/0292 |
| | | | | 711/170 |

(Continued)

FOREIGN PATENT DOCUMENTS

| | | |
|---|---|---|
| CN | 120660195 A | 9/2025 |
| EP | 4662710 A1 | 12/2025 |
| WO | 2024167586 A1 | 8/2024 |

OTHER PUBLICATIONS

Azarkhish, Erfan, Christoph Pfister, Davide Rossi, Igor Loi, and Luca Benini. "Logic-base interconnect design for near memory computing in the smart memory cube." IEEE Transactions on Very Large Scale Integration (VLSI) Systems 25, No. 1 (2016): 210-223.*

(Continued)

*Primary Examiner* — Tracy A Warren
(74) *Attorney, Agent, or Firm* — FIG. 1 Patents

(57) ABSTRACT

Multi-stack compute chip and memory architecture is described. In accordance with the described techniques, a package includes a plurality of computing stacks, and each computing stack includes at least one compute chip and a memory. The package also includes one or more interconnects that couple the computing stacks to at least one other computing stack for sharing the memory in a coherent fashion across the plurality of computing stacks.

46 Claims, 8 Drawing Sheets

(56) References Cited

U.S. PATENT DOCUMENTS

| 2016/0124873 | A1* | 5/2016 | Xu | ..................... | G06F 3/061 |
| | | | | | 711/167 |
| 2020/0174952 | A1 | 6/2020 | Lee | | |
| 2020/0183825 | A1* | 6/2020 | Ellis | ..................... | G06F 3/0685 |
| 2020/0194262 | A1 | 6/2020 | Delacruz et al. | | |
| 2020/0328187 | A1 | 10/2020 | Cho et al. | | |
| 2021/0034524 | A1 | 2/2021 | Leidel et al. | | |
| 2022/0011940 | A1* | 1/2022 | Leidel | ................. | G11C 7/1075 |
| 2022/0415379 | A1 | 12/2022 | Biswas et al. | | |

OTHER PUBLICATIONS

PCT/US2023/085320, "International Search Report and Written Opinion", International Application No. PCT/US2023/085320, Apr. 24, 2024.

"Foreign Office Action", EP Application No. 23921562.7, Sep. 16, 2025, 3 pages.

\* cited by examiner

100

200

102

| | | 202 | | |
|---|---|---|---|---|
| | 110 | 110 | 110 | 110 |
| 110 | Stack 104 | 110 Stack 104 | 110 Stack 104 | 110 Stack 104 110 |
| | 110 | 110 | 110 | 110 |
| 110 | Stack 104 | 110 Stack 104 | 110 Stack 104 | 110 Stack 104 110 |
| 202 | 110 | 110 | 110 | 110 202 |
| 110 | Stack 104 | 110 Stack 104 | 110 Stack 104 | 110 Stack 104 110 |
| | 110 | 110 | 110 | 110 |
| 110 | Stack 104 | 110 Stack 104 | 110 Stack 104 | 110 Stack 104 110 |
| | 110 | 110 | 110 | 110 |
| | | 202 | | |

400

102    102

402

402    402

102    102

402

Key

■ Stack 104

▨ Interconnect 110

▭ Interface and Components 202

●——● Communicable Coupling 402

600

Memory Request Unit 112

Figure 7:
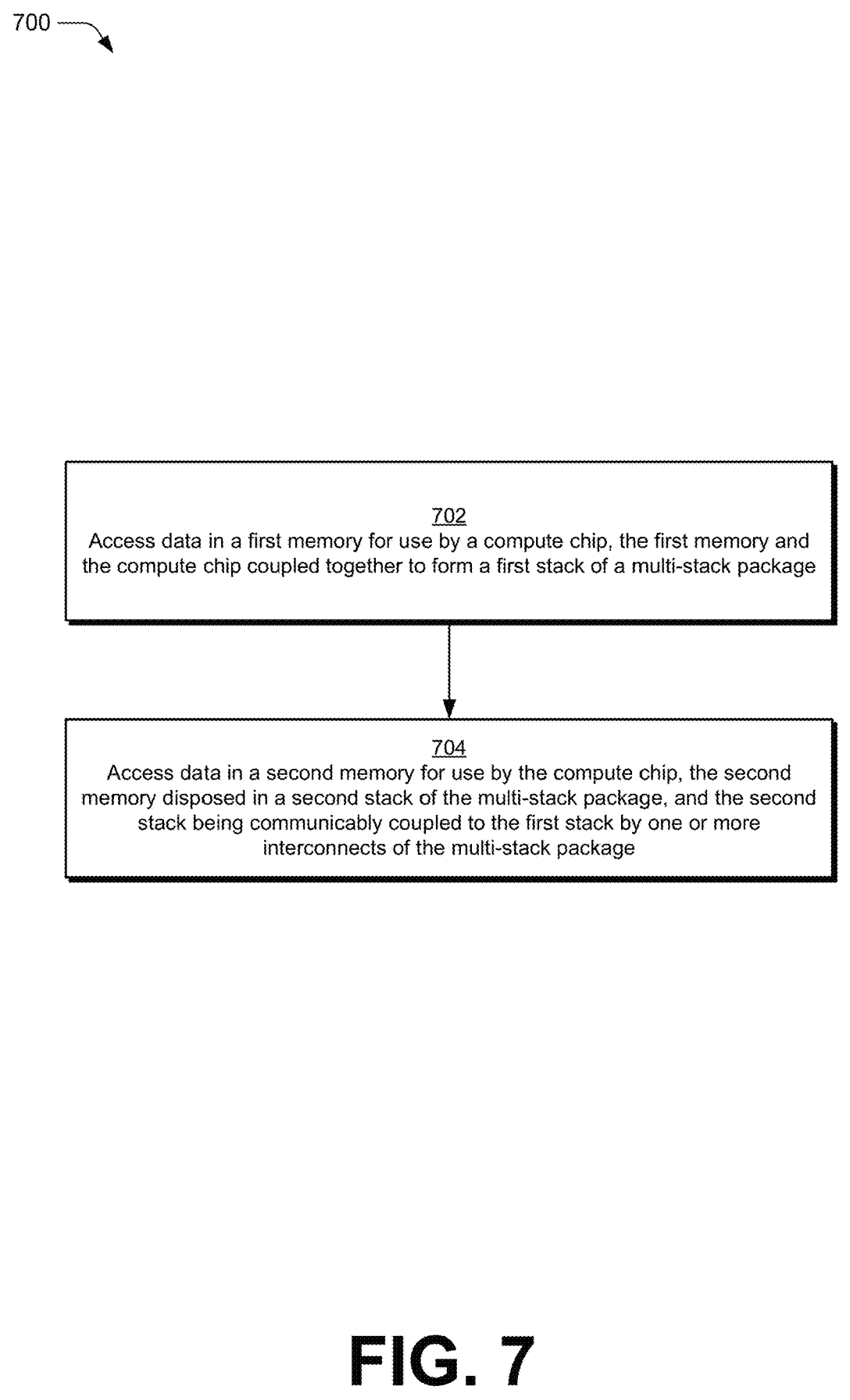

700 ⟍

```
┌──────────────────────────────────────────────────────────────┐
│                                                              │
│                            702                               │
│   Access data in a first memory for use by a compute chip,   │
│   the first memory and the compute chip coupled together     │
│   to form a first stack of a multi-stack package             │
│                                                              │
└──────────────────────────────────────────────────────────────┘
                              │
                              ▼
┌──────────────────────────────────────────────────────────────┐
│                                                              │
│                            704                               │
│   Access data in a second memory for use by the compute      │
│   chip, the second memory disposed in a second stack of      │
│   the multi-stack package, and the second stack being        │
│   communicably coupled to the first stack by one or more     │
│   interconnects of the multi-stack package                   │
│                                                              │
└──────────────────────────────────────────────────────────────┘
```

Figure 8:
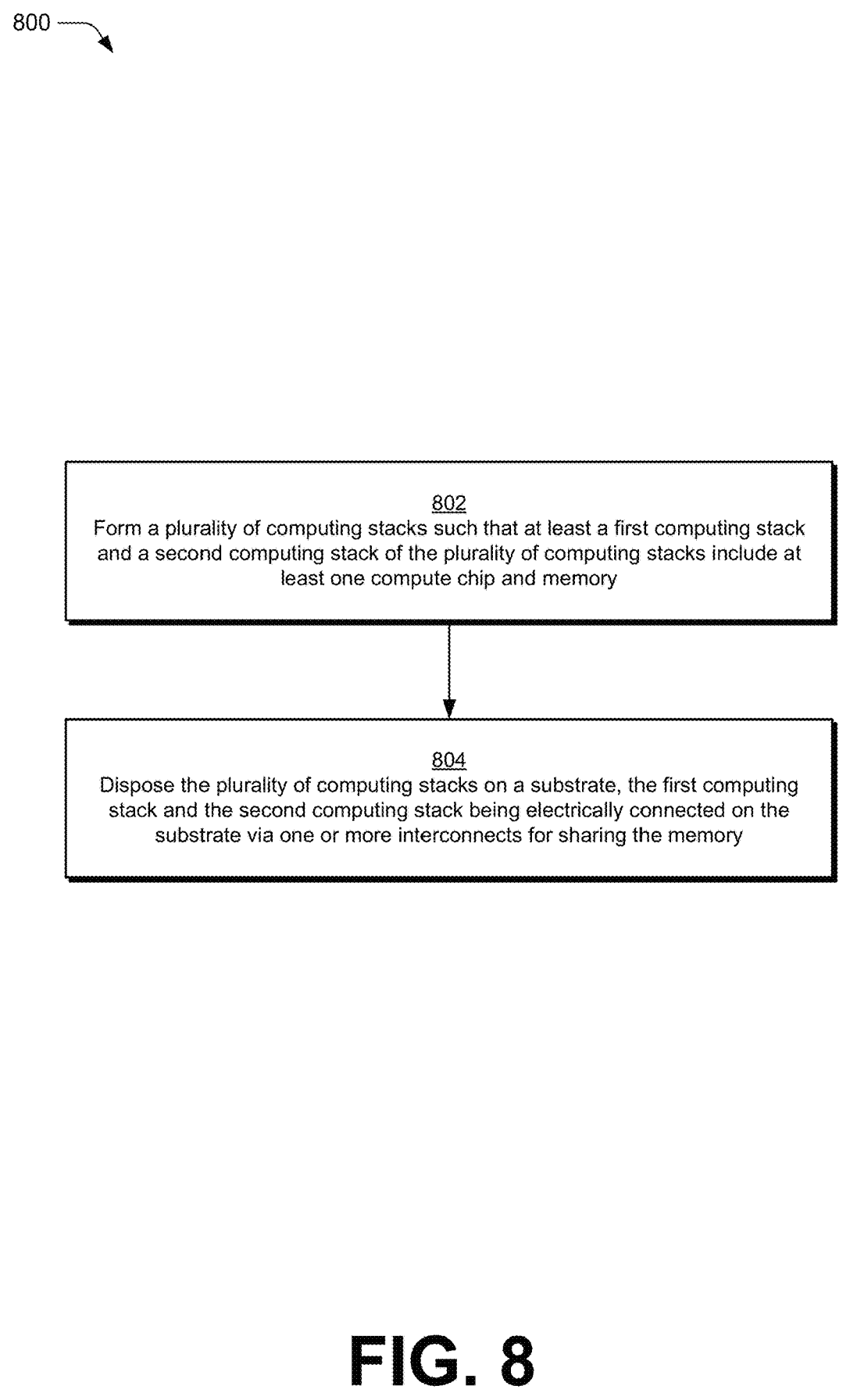

802
Form a plurality of computing stacks such that at least a first computing stack and a second computing stack of the plurality of computing stacks include at least one compute chip and memory

---

804
Dispose the plurality of computing stacks on a substrate, the first computing stack and the second computing stack being electrically connected on the substrate via one or more interconnects for sharing the memory

MULTI-STACK COMPUTE CHIP AND MEMORY ARCHITECTURE

RELATED APPLICATION

This application claims priority under 35 U.S.C. § 119(e) to U.S. Provisional Patent Application No. 63/484,183, filed Feb. 9, 2023, and titled "Multi-Stack Compute Chip and Memory Architecture," the entire disclosure of which is hereby incorporated by reference.

BACKGROUND

Advances in computing technologies are continually being made, as evidenced, for example, by the expansion of machine learning into numerous and differing fields. Along with advancements to computing applications, computer hardware is also advancing, such as to provide improved processing and memory that is faster, more performant, consumes less power, and so forth.

BRIEF DESCRIPTION OF THE DRAWINGS

FIG. 7 depicts a procedure in an example implementation of multi-stack compute chip and memory architecture.

FIG. 8 depicts a procedure in an example implementation of fabricating a multi-stack package.

DETAILED DESCRIPTION

Overview

Figure 1:
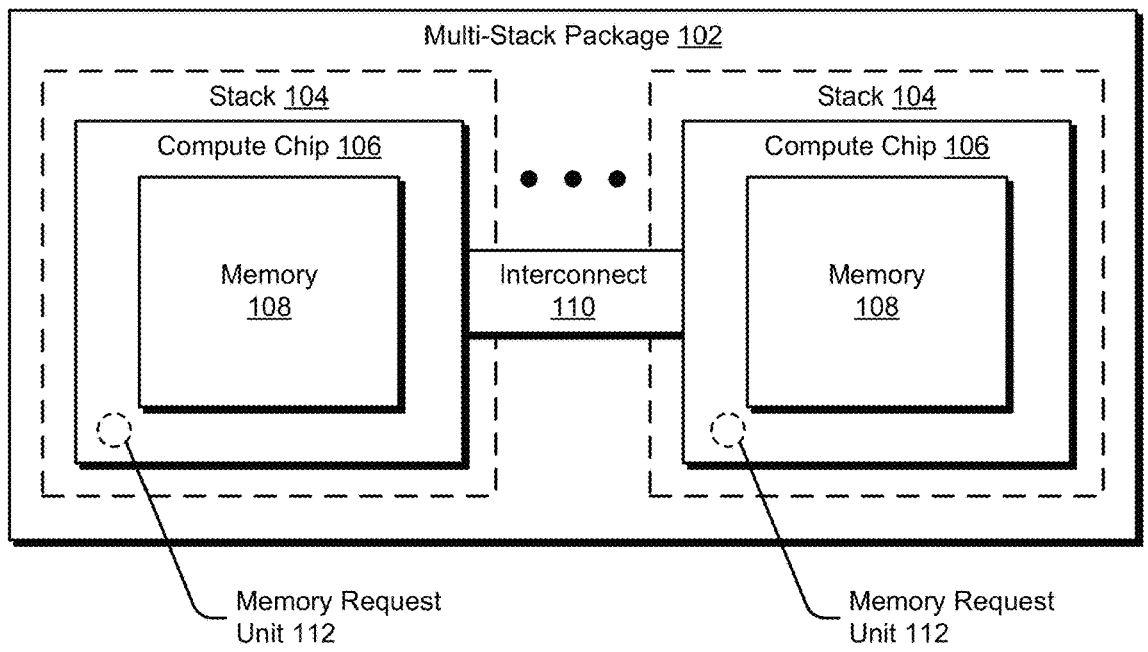
FIG. 1 is a block diagram of a non-limiting example system having multiple stacks of compute chips and memory that are interconnected to form a package according to some implementations.
Figure 1:
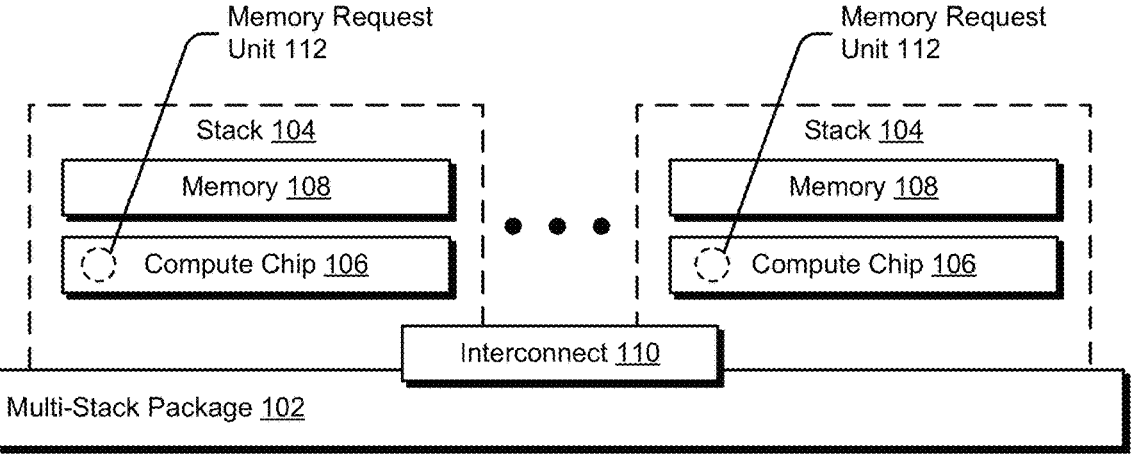

Multi-stack compute chip and memory architecture is described. In accordance with the described techniques, a package includes a plurality of computing stacks, and, in some variations, each computing stack includes at least one compute chip and a memory (e.g., at least one memory die). By way of example, the memory is a stacked memory, such as a stack of dynamic random-access memory (DRAM) that is three-dimensionally (3D) stacked directly above (or below) a compute chip to form a stack. This provides the compute chip with high bandwidth access to the data in the memory of the respective stack in a power-efficient manner. The package also includes one or more interconnects that couple the computing stacks to at least one other computing stack for sharing memory in a coherent fashion across the plurality of computing stacks. Through the interconnects and the memories of the multiple stacks, the package provides such a shared, coherent memory with non-uniform memory access (NUMA) characteristics.

In some aspects, the techniques described herein relate to an apparatus including: a plurality of computing stacks, wherein a first computing stack and a second computing stack of the plurality of computing stacks each include at least one compute chip and memory, and one or more interconnects that couple the first computing stack to at least the second computing stack for sharing the memory.

In some aspects, the techniques described herein relate to an apparatus, wherein the memory is one or more memory die.

In some aspects, the techniques described herein relate to an apparatus, wherein the memory of the first computing stack includes dynamic random-access memory (DRAM) and the memory of the second computing stack includes non-volatile memory.

In some aspects, the techniques described herein relate to an apparatus, wherein the memory of the first computing stack includes dynamic random-access memory (DRAM) and non-volatile memory.

In some aspects, the techniques described herein relate to an apparatus, wherein the memory of the first computing stack includes a first portion and a second portion, wherein the first portion is embedded in the at least one compute chip, and wherein the second portion is separate from and communicably coupled to the at least one compute chip.

In some aspects, the techniques described herein relate to an apparatus, wherein the at least one compute chip includes at least one central processing unit, graphics processing unit, field programmable gate array, accelerator, or digital signal processor.

In some aspects, the techniques described herein relate to an apparatus, wherein the first computing stack further includes one or more memory request units adapted to perform at least one of: send and receive data over the one or more interconnects between the memory of the first computing stack and the second computing stack, provide coherent shared memory across memory of the plurality of computing stacks, or provide coherent shared memory across memory of a subset of the plurality of computing stacks.

In some aspects, the techniques described herein relate to an apparatus, wherein the at least one compute chip of the first computing stack is configured to access data from the memory of the first computing stack faster than data from the memory of the second computing stack, wherein the at least one compute chip of the first computing stack accesses the data from the memory of the second computing stack over the one or more interconnects.

In some aspects, the techniques described herein relate to an apparatus, wherein the one or more interconnects are disposed on or within at least one of a silicon interposer, a silicon bridge, a glass interposer, an organic package, or a silicon photonic interconnect.

In some aspects, the techniques described herein to an apparatus, wherein the plurality of computing stacks are interconnected with the one or more interconnects in an array topology.

In some aspects, the techniques described herein relate to an apparatus, wherein the plurality of computing stacks are interconnected with the one or more interconnects in a grid topology.

In some aspects, the techniques described herein relate to an apparatus, wherein the apparatus is a multi-stack package communicably coupled to at least one additional multi-stack package.

In some aspects, the techniques described herein relate to an apparatus, wherein the memory of the first computing stack is disposed in a stacked arrangement above or below the at least one compute chip of the first computing stack, and the stacked arrangement is disposed on a substrate of the apparatus.

In some aspects, the techniques described herein relate to an apparatus, wherein the memory of the first computing stack is disposed in a side-by-side arrangement with the at least one compute chip of the first computing stack.

In some aspects, the techniques described herein relate to an apparatus, wherein the side-by-side arrangement is disposed on a substrate of the apparatus.

In some aspects, the techniques described herein relate to an apparatus, wherein the side-by-side arrangement is disposed in a stacked arrangement above or below a circuitry die of the first computing stack, and the stacked arrangement is disposed on a substrate of the apparatus.

In some aspects, the techniques described herein relate to an apparatus, wherein the circuitry die includes at least one of: a memory controller, cache, data fabric, network on a chip (NoC), or memory interface circuits.

In some aspects, the techniques described herein relate to a system on package (SoP) including: a plurality of computing stacks, wherein: each computing stack of the plurality of computing stacks includes at least one compute chip and memory, and at least a first computing stack of the plurality of computing stacks is coupled to at least a second and third computing stacks of the plurality of computing stacks via interconnects for sharing the memory, and one or more interfaces to couple the system on package to at least one external device.

In some aspects, the techniques described herein relate to a system on package (SoP), wherein the at least one external device includes at least one of: an integrated circuit, external memory, a motherboard, or an additional system on package.

In some aspects, the techniques described herein relate to a method for fabricating a multi-stack package including: forming a plurality of computing stacks, wherein a first computing stack and a second computing stack of the plurality of computing stacks each include at least one compute chip and memory, and disposing the plurality of computing stacks on a substrate, the first computing stack and the second computing stack being electrically connected on the substrate via one or more interconnects for sharing the memory.

FIG. 1 is a block diagram of a non-limiting example system 100 having multiple stacks of compute chips and memory that are interconnected to form a package according to some implementations. In particular, the illustrated example depicts two views of the system 100, including a top-down, "birds eye" view and a side cutaway view. It is to be appreciated that the components are not drawn to scale in either view and in implementation vary in size and positioning relative to one another. Additionally, the number of components of the system 100 differs in variations without departing from the spirit or scope of the described techniques.

In accordance with the described techniques, the system 100 is or includes a multi-stack package 102 having multiple stacks 104, e.g., at least a first stack 104 and a second stack 104. The illustration includes ellipses to indicate that in one or more implementations, the multi-stack package 102 includes more than two stacks 104, some examples of which are depicted in FIGS. 2-5.

The multiple stacks 104 include a compute chip 106 and a memory 108. For instance, each stack 104 includes at least a compute chip 106 and a memory 108, e.g., a memory die. In variations, a stack 104 includes more than one compute chip 106 (e.g., two or more compute chips) and/or more memory than a single memory die (e.g., multiple memory die and/or at least one memory die and additional memory embedded in the compute chip 106). By way of example, a stack 104 includes one or more compute chips 106 and a stacked memory 108. In one or more implementations, the memory 108 is stacked directly on top of the one or more compute chips 106. In one or more implementations, the memory 108 is stacked directly below the one or more compute chips 106. In one or more implementations, the compute chip 106 is disposed between a first portion of the memory 108 and a second portion of the memory 108, such that one of those portions is stacked directly on top of the one or more compute chips 106 and the other portion is stacked directly below the one or more compute chips 106. Alternatively or in addition, the memory 108 and the compute chips 106 are interleaved. It is to be appreciated that in variations one or more compute chips 106 and the memory 108 (e.g., one or more memory die) are arranged in different ways to form the stack 104 without departing from the described techniques.

The compute chip 106 and the memory 108 of a particular stack 104 are coupled to one another using any one or more of a variety of wired or wireless connection types. Example wired connections include, but are not limited to, one or more memory channels, buses (e.g., a data bus), interconnects, through silicon vias, data links (e.g., 1024 data links), traces, photonic interconnects, and planes to name a few. The stacked arrangement of the compute chip 106 and the memory 108 provides the compute chip 106 with high-bandwidth access to data in the memory 108 within the respective stack 104 and provides this access with reduced power consumption. This is due to shorter data communication pathways relative to configurations where the memory 108 is physically and/or topologically further away from the compute chip 106—as well as shorter data communication pathways relative to the memory 108 in another stack 104.

The illustrated example also depicts interconnect 110. The interconnect 110 couples (e.g., communicably couples) the stacks 104 of the multi-stack package 102. In accordance with the described techniques, a stack 104 is connected by one or more interconnects 110 to at least one other stack 104. Via those interconnects 110, the system 100 transfers data between the stacks 104. The interconnects 110 also enable access to the data maintained in the memory 108 of a stack 104 by other stacks 104. In at least one scenario, for instance, one or more interconnects 110 enable the compute chip 106 of a first stack 104 to access data loaded into the memory 108 of at least a second stack 104. Based on this, the multi-stack package 102 is configured to provide coherent shared memory using the memory 108 of the multiple stacks 104. For instance, the multi-stack package 102 uses the memory 108 of a subset of stacks (e.g., fewer than all of the multiple stacks) to provide such coherent shared memory. Alternatively, the multi-stack package 102 uses at least a portion of the memory 108 of all the stacks 104 to provide such coherent shared memory.

In one or more implementations, the compute chip 106 is an electronic circuit that performs various operations on and/or using data in the memory 108, such as data in the memory 108 of the compute chip 106's stack 104 or data in the memory 108 of at least one other stack 104. By way of example and not limitation, such operations are associated with a program, an application, and/or a thread (not shown). In accordance with the described techniques, the compute chip 106 of a given stack is any one or more of a variety of processing units, such as a central processing unit (CPU), a graphics processing unit (GPU), accelerator, an Accelerated Processing Unit (APU), a parallel accelerated processor, a digital signal processor, an artificial intelligence (AI) or machine learning accelerator, a field programmable gate array (FPGA), and so forth. In variations, the compute chip 106 corresponds to one or more different types of components without departing from the spirit or scope of the described techniques, such as a cache.

Although a single compute chip 106 is illustrated in each stack 104 of the multi-stack package 102, a stack 104 optionally includes any number of compute chips 106 of the same or different types. In one or more implementations, each stack 104 of the multi-stack package 102 includes a same type of one or more compute chips 106, e.g., each stack includes a same processing unit (subject to manufacturing differences) and/or a same combination of processing units (subject to manufacturing differences). In other implementations, however, at least one stack 104 has one or more different compute chips 106 from at least one other stack 104, e.g., the compute chip 106 of a first stack 104 is a CPU and the compute chip 106 of a second stack 104 is a different type of CPU or is a GPU.

The memory 108 is a device or system that is used to store information, such as for immediate use in a device, e.g., by the compute chip 106 of the respective stack 104 or by the compute chip 106 of at least one other stack 104. In one or more implementations, the memory 108 corresponds to semiconductor memory where data is stored within memory cells on one or more integrated circuits. In at least one example, the memory 108 corresponds to or includes volatile memory, examples of which include random-access memory (RAM), dynamic random-access memory (DRAM), synchronous dynamic random-access memory (SDRAM), phase-change memory (PCM), memristors, static random-access memory (SRAM), and so forth. In variations, the memory 108 is packaged or configured in any of a variety of different manners.

Further examples of memory configurations include low-power double data rate (LPDDR), also known as LPDDR SDRAM, which is a type of synchronous dynamic random-access memory. In variations, LPDDR consumes less power than other types of memory and/or has a form factor suitable for mobile computers and devices, such as mobile phones. Examples of LPDDR include, but are not limited to, low-power double data rate 2 (LPDDR2), low-power double data rate 3 (LPDDR3), low-power double data rate 4 (LPDDR4), and low-power double data rate 5 (LPDDR5).

In at least one variation, the memory 108 is a stacked memory, an example of which is stacked DRAM. Alternatively or additionally, the memory 108 corresponds to or includes non-volatile memory, examples of which include Ferro-electric RAM, Magneto-resistive RAM, flash memory, read-only memory (ROM), programmable read-only memory (PROM), erasable programmable read-only memory (EPROM), and electronically erasable programmable read-only memory (EEPROM). It is to be appreciated that the memory 108 is configurable in a variety of ways without departing from the spirit or scope of the described techniques.

In one or more variations, at least one stack 104 of the multi-stack package 102 includes a cache (or more than one cache) in addition to or in place of the memory 108. Further, although discussed throughout as having one or more compute chips 106 and memory 108 (e.g., one or more memory die), in variations, a stack 104 of the multi-stack package 102 includes additional and/or different components stacked in relation to one another in accordance with the described techniques.

Although not shown, in one or more implementations, a memory controller manages access of the compute chip 106 to the memory 108, such as by sending read and write requests to the memory 108 and receiving responses from the memory 108.

As noted above, the multi-stack package 102 includes one or more interconnects 110, which connect the stacks 104. For example, an interconnect 110 connects at least two stacks 104 and is configured to route data between the at least two stacks 104. In other words, the interconnect 110 enables data transfer and/or exchange between the at least two stacks. Broadly, an interconnect 110 is a component, system, and/or device over which data is transferrable between endpoints, e.g., between at least two stacks 104. In variations, the multi-stack package 102 includes a plurality of interconnects 110. In one or more variations, interconnects 110 are implemented on or at least partially within a silicon interposer (e.g., a passive silicon interposer or an active silicon interposer), a glass interposer, a silicon bridge, an organic package, or with a photonic interconnect (e.g., a silicon photonic interconnect), to name just a few. Alternatively or additionally, the interconnects 110 are implemented as buses (e.g., a data bus), data links (e.g., 1024 data links), traces, and/or planes. In variations, interconnects 110 are configured in different ways without departing from the spirit or scope of the described techniques.

In accordance with the described techniques, the interconnects 110 connect the stacks 104 of the multi-stack package 102 in any of a variety of topologies, such as a two-dimensional, i.e., 2D, grid, to facilitate data communication between the stacks 104. Using the interconnects 110, the system 100 is capable of implementing coherent shared memory across the separate memories 108 of the multiple stacks 104 of the multi-stack package 102. Example topologies having different dimensionalities are discussed in more detail below in relation to FIGS. 2-5.

The illustrated example also depicts memory request unit 112. In one or more implementations, the memory request unit 112 is a logical block configured to manage the memory 108, such as to manage the memory 108 of an individual stack 104, the memory 108 of more than one stack 104, and/or in coordination with at least one additional memory request unit 112 (e.g., of another stack 104). In one or more implementations, one or more of the stacks 104 includes multiple memory request units, where the separate memory request units perform different operations to carry out the techniques discussed above and below. In one variation, for instance, at least one of the stacks 104 includes a first memory request unit that sends and/or receives data over the interconnects 110 and also includes a second memory request unit that is adapted to provide coherent shared memory.

In the illustrated example, each of the stacks 104 is depicted with a respective memory request unit 112. In one or more variations, however, each stack 104 includes more than one memory request unit as discussed just above, e.g., to perform a dedicated subset of memory-based operations. In at least one variation, a memory request unit 112 manages the memory 108 of more than one stack 104, such that at least one of the stacks 104 does not include a memory request unit 112. For example, one memory request unit 112 manages the memory 108 of a subset of the multiple stacks 104 (but at least two stacks 104). In another example, one memory request unit 112 manages the memory 108 for all the stacks 104 of the multi-stack package 102. It is to be appreciated that a number of memory request units 112 implemented for a multi-stack package 102 differs in variations.

In addition to implementing different numbers of memory request units 112 for a multi-stack package 102, in variations, the memory request unit 112 is implemented in different components of the multi-stack package 102. In at least one variation, for instance, memory request units 112 are implemented in the compute chips 106, as in the illustrated example. However, memory request units 112 are implementable in other components in variations. For example, the memory request unit 112 is configured as a dedicated circuit integral with (e.g., soldered to) each stack (e.g., but separate from the compute chip 106) that performs a variety of the operations discussed above and below. Alternatively or in addition, the memory request unit 112 is configured as a microcontroller, such as a microcontroller disposed on a die integral with each stack or disposed on a die of the multi-stack package 102, which runs firmware to perform the variety of operations discussed above and below. In one or more implementations, the memory request unit 112 is shared among multiple stacks 104. The memory request unit 112 is implementable in one or more of a variety of components in accordance with the described techniques.

In one or more implementations, the one or more memory request units 112 operate the memories 108 of the multiple stacks 104 of the multi-stack package 102 (or the memories 108 of at least a subset of the stacks 104) as a shared, coherent memory. Those memory request units 112 do so, for instance, according to one or more memory management techniques. For example, one or more of the memory request units 112 expose the memories 108 across the multiple stacks 104 as a coherent shared memory with non-uniform memory access (NUMA) characteristics. Such a memory has NUMA characteristics because, from the position of a given compute chip 106, data in the memory 108 of the same stack 104 as the given compute chip 106 is accessible faster than data in the memory 108 of a different stack (e.g., which is across at least one interconnect 110). This is due, at least in part, to the differences in physical and topological distance as well as numbers of interfaces and components across which the data in the other stack 104 (e.g., the remote stack) is accessed.

Additionally or alternatively, one or more of the memory request units 112 is configured to cause high-speed data movement among one or more of the stacks 104, e.g., a subset of the stacks. In at least one variation, one or more of the memory request units 112 implement separate data movers. In at least one variation, these data movers are usable to implement message passing interface (MPI) with separate ranks for one or more of the stacks 104, e.g., a subset of the stacks. In one or more implementations, the data movers use one or more other formats and/or standards that are different from MPI.

The multi-stack package 102 optionally includes one or more additional controllers to link to additional devices, such as a Peripheral Component Interconnect Express (PCIe) controller, a Serial Advanced Technology Attachment (SATA) controller, a Universal Serial Bus (USB) controller, a Serial Peripheral Interface (SPI) controller, a Low Pin Count (LPC) controller, HyperTransport (HT), Compute eXpress Link (CXL) and so forth. In variations, the multi-stack package 102 includes one or more additional components that are not depicted in this example, such as interfaces (e.g., to connect with components and/or systems external to the multi-stack package 102), controllers, system managers, and optical components, to name just a few. By way of example, the multi-stack package 102 is configured to connect to and communicate with at least one other multi-stack package 102 or a different component or system using one or more such additional components, e.g., one or more silicon photonic interconnects and/or a network interface card (NIC).

The system 100 is configured for incorporation into a device or apparatus. Examples of different types of devices or apparatuses in which the system 100 can be incorporated include, by way of example and not limitation, a server, a personal computer (e.g., a desktop or tower computer), a smartphone or other wireless phone, a tablet or phablet computer, a notebook computer, a laptop computer, a wearable device (e.g., a smartwatch, an augmented reality headset or device, a virtual reality headset or device), an entertainment device (e.g., a gaming console, a portable gaming device, a streaming media player, a digital video recorder, a music or other audio playback device, a television, a set-top box), an Internet of Things (IoT) device, an automotive computer, a computer of other types of vehicles (e.g., scooters, e-bikes, motorcycles), a system on chip (SoC), a system on package (SoP) sometimes referred to as a system in a package (SiP), and so forth.

Figure 2:
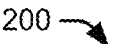
FIG. 2 is a block diagram of a non-limiting example of a multi-stack package having the stacks arranged in a grid.

FIG. 2 is a block diagram of a non-limiting example 200 of a multi-stack package having the stacks arranged in a grid.

In the illustrated example 200, the multi-stack package 102 includes multiple stacks 104, which are configurable in a variety of ways as discussed above. The stacks 104 are connected with other stacks 104 of the multi-stack package 102 in a grid, e.g., a two-dimensional (2D) grid. As discussed above, the interconnects 110 connect the stacks 104 of the multi-stack package 102. As also noted above, the interconnects 110 enable the memory 108 of an individual stack 104 to be shared with one or more additional stacks 104. In this way, the compute chip 106 of an individual stack 104 can access, via the interconnects 110, data in the memory 108 of one or more additional stacks 104 of the multi-stack package 102 along with data in the memory 108 of the same stack 104.

In this example, the multi-stack package 102 is depicted including interface components 202. These interface components 202 support interactions with different devices and/or systems, such as with additional multi-stack packages 102, other integrated circuits, external memory, a motherboard, and so forth. Examples of the interface components 202 include, but are not limited to, a network interface card (NIC), a photonic interconnect component, one or more sockets, a Peripheral Component Interconnect Express (PCIe) component, a Serial Advanced Technology Attachment (SATA) component, a Universal Serial Bus (USB) component, a Serial Peripheral Interface (SPI) component, a Low Pin Count (LPC) component, a Compute eXpress Link (CXL) component, and so forth. In one or more implementations, the interconnects 110 also connect the stacks 104 to the interface components 202. In at least one variation, however, the stacks 104 are connected to interface components 202 (or other components) using different couplings than are used to connect the stacks 104, one stack to another stack.

In one or more implementations, a system or apparatus includes additional and/or different types of memory that are external to the multi-stack package 102. Alternatively or in addition, a system or apparatus includes additional and/or different types of memory within one or more of the multi-stack packages 102, where the additional and/or different types of memory are separate from the memory 108 in the stacks 104. For example, one or more additional memories are integrated within the package and are not part of the stacks 104. Instead, those one or more additional memories are placed "outside" the interface components 202 relative to the multi-stack package 102, e.g., on a side of at least one interface component 202 opposite the multi-stack package 102. In relation to the example 200, for instance, from the depicted top-down perspective, one or more of those additional memories can be positioned to a left of the leftmost interface component 202, above the topmost interface component 202, to the right of the rightmost interface component 202, and/or below the bottommost interface component 202. In the context of a different arrangement of stacks 104 of a multi-stack package 102, consider FIG. 3.

Figure 3:
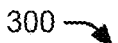
FIG. 3 is a block diagram of a non-limiting example of a multi-stack package having the stacks arranged in an array.
Figure 3:
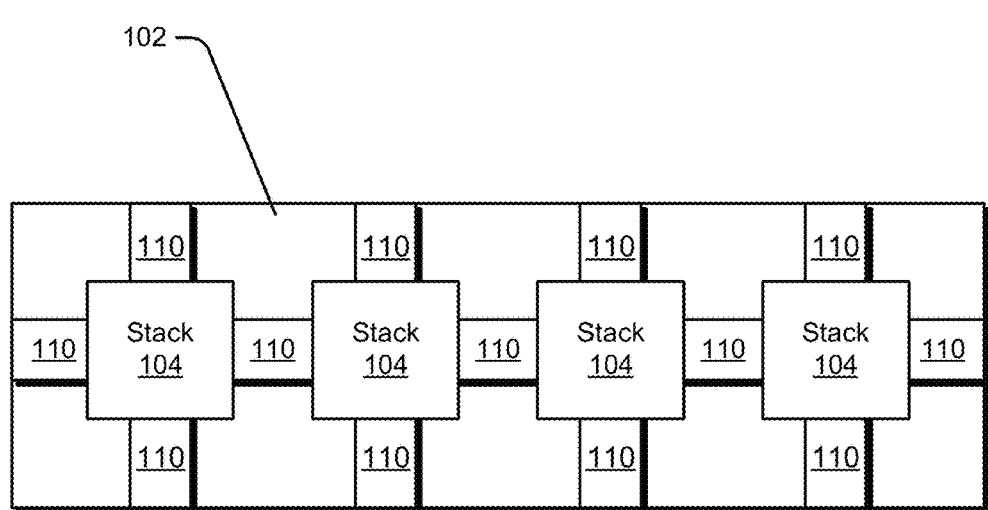

FIG. 3 is a block diagram of a non-limiting example 300 of a multi-stack package having the stacks arranged in an array.

In the illustrated example 300, the multi-stack package 102 includes multiple stacks 104, which are configurable in a variety of ways as discussed above. The stacks 104 are connected with other stacks 104 of the multi-stack package 102 in an array, e.g., a one-dimensional (1D) array. As discussed throughout, the interconnects 110 connect the stacks 104 of the multi-stack package 102. As also noted above, the interconnects 110 enable the memory 108 of an individual stack 104 to be shared with one or more additional stacks 104. In this way, the compute chip 106 of an individual stack 104 can access, via the interconnects 110, data in the memory 108 of one or more additional stacks 104 of the multi-stack package 102 along with data in the memory 108 of the same stack 104.

The examples depicted in FIGS. 2-3 are merely demonstrative, and a layout of stacks 104 of a multi-stack package 102 can differ in variations without departing from the spirit or scope of the described techniques.

Figure 4:
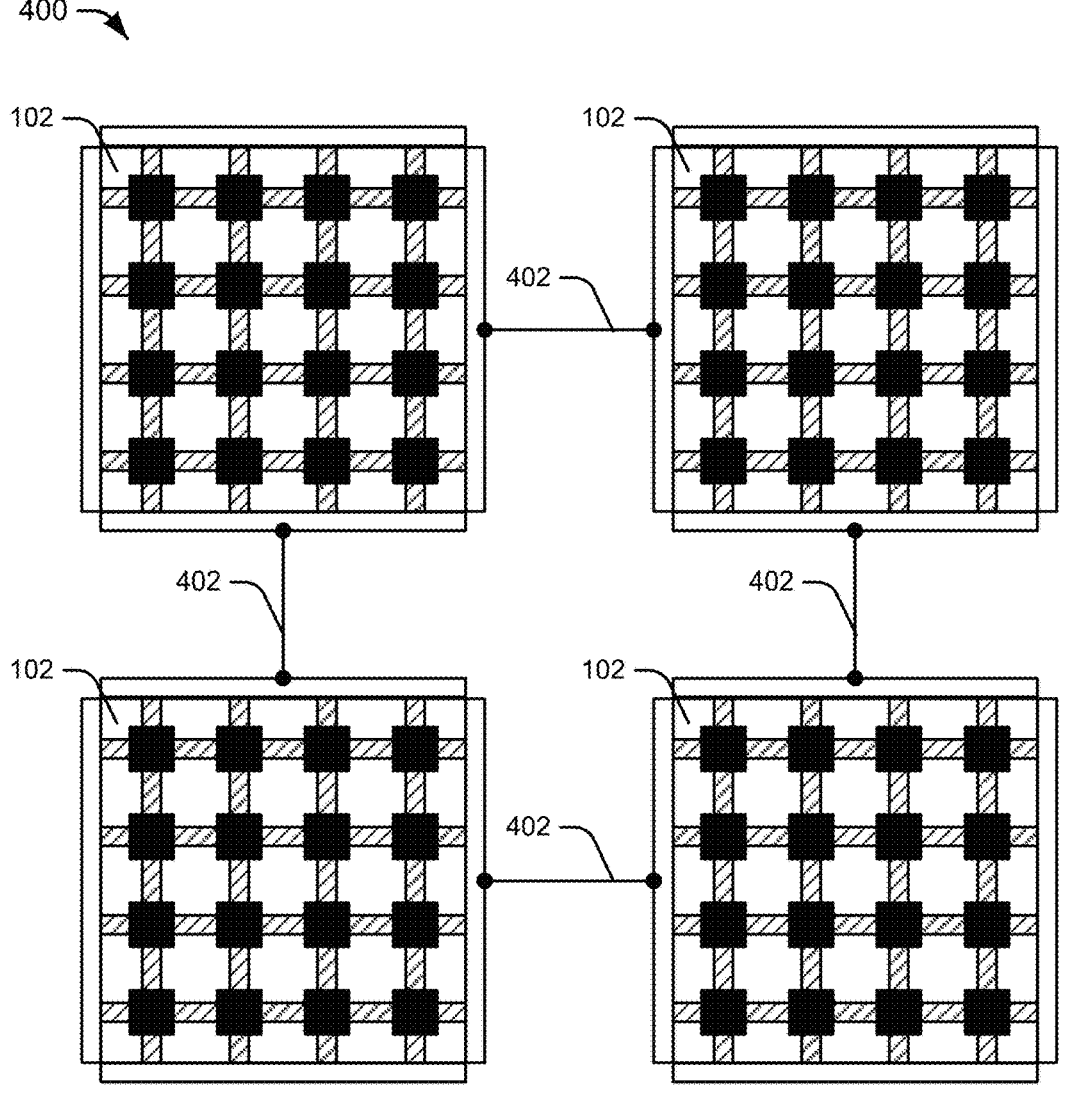
FIG. 4 is a block diagram of a non-limiting example in which a multi-stack package is extended through connections with additional multi-stack packages.
Figure 4:
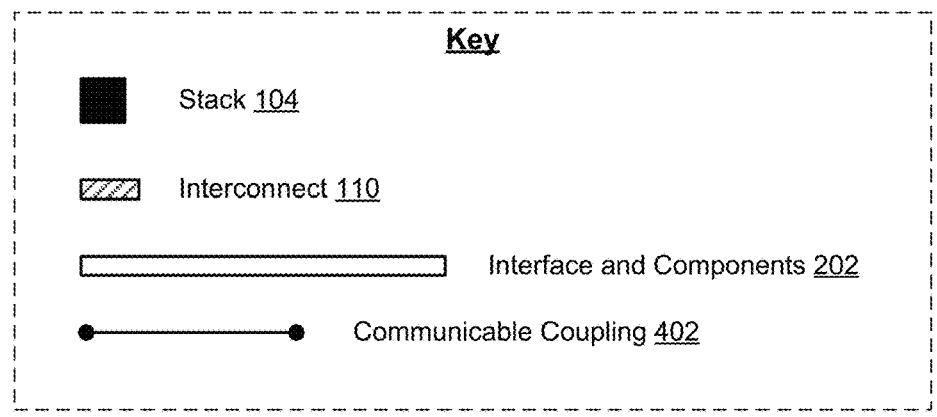

FIG. 4 is a block diagram of a non-limiting example 400 in which a multi-stack package is extended through connections with additional multi-stack packages.

The illustrated example 400 includes a plurality of multi-stack packages 102. The multi-stack package 102 are connected via communicable couplings 402. This illustrates a scenario where a multi-stack package 102 is extended by connecting it to one or more additional multi-stack packages 102. In one or more implementations, this enables shared coherent memory across the multiple multi-stack packages 102 in addition to shared coherent memory across the multiple stacks of an individual package.

Figure 5:
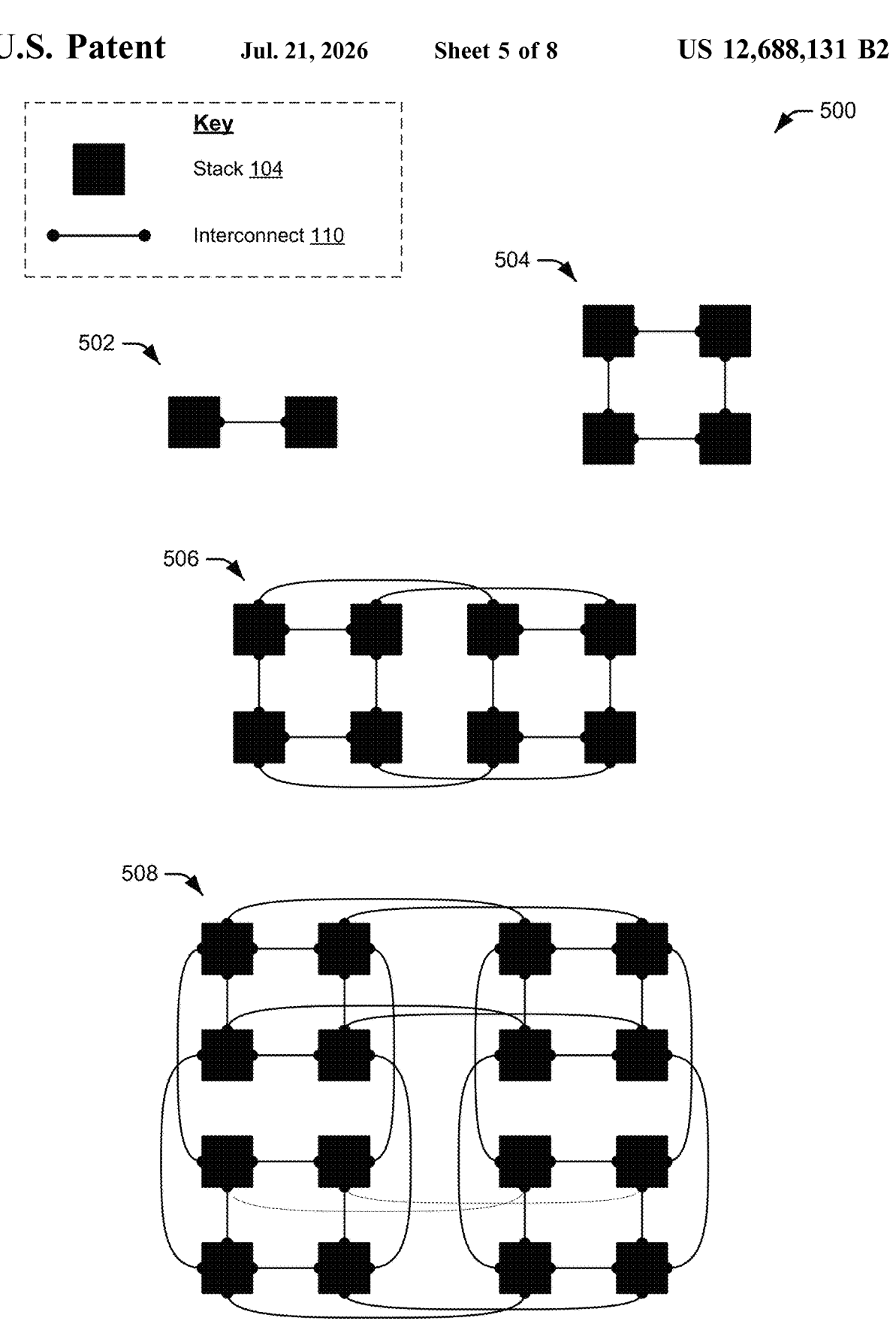
FIG. 5 depicts a non-limiting example of different topologies for connecting stacks of a multi-stack package with interconnects.

FIG. 5 depicts a non-limiting example 500 of different topologies for connecting stacks of a multi-stack package with interconnects.

In particular, the illustrated example 500 includes a first topology 502, a second topology 504, a third topology 506, and a fourth topology 508. Each of the topologies depicts a plurality of stacks 104 and interconnects 110 connecting the stacks. The first topology 502 is an array of stacks 104 and is an example of a one-dimensional, i.e., 1D, topology. The second topology 504 is a grid of stacks 104 (e.g., four stacks 104) and is an example of a two-dimensional, i.e., 2D, topology. The third topology 506 is another grid of stacks 104 (e.g., eight stacks 104) and is an example of a three-dimensional, i.e., 3D, topology. The fourth topology 508 is another grid of stacks 104 (e.g., sixteen stacks 104) and is an example of a four-dimensional, i.e., 4D, topology. In one or more implementations, the dimensionality of the topologies is based on a number of other computing stacks to which an individual computing stack is connected via the interconnects 110. In at least one variation, for instance, the dimensionality is based on a number of computing stacks to which a computing stack, connected to the fewest number other computing stacks in the topology, is connected via the interconnects 110. By way of example, each computing stack 104 of the third topology 506 is connected to three other computing stacks and, therefore, the third topology 506 is a 3D topology. In contrast, each computing stack 104 of the fourth topology 508 is connected to four other computing stacks and, therefore, the fourth topology 508 is a 4D topology. Said another way, the dimensionality of a topology relates to a number of interconnects between a given stack and other stacks, e.g., how many other stacks the given stack is connected to. For instance, a stack 104 having interconnects 110 to N different stacks corresponds to a ND topology. As another specific example (not depicted), if a given stack 104 is connected via interconnects to ten (10) other stacks 104, then the topology corresponds to a 10D topology.

It is to be appreciated that in variations the interconnects 110 and the stacks 104 can be arranged in numerous different topologies of higher or lower dimensions without departing from the spirit or scope of the described techniques.

Figure 6:
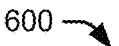
FIG. 6 depicts a non-limiting example of an arrangement of a stack with a compute chip and memory according to some implementations.
Figure 6:
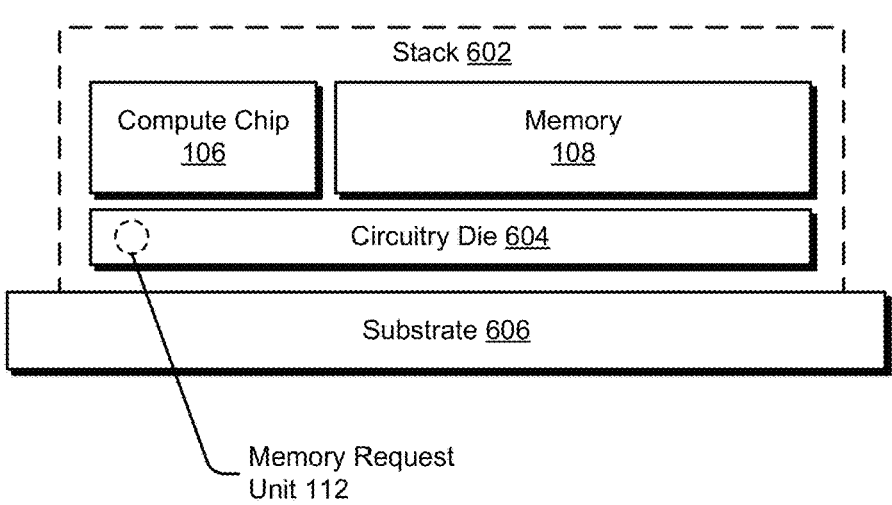

FIG. 6 depicts a non-limiting example 600 of an arrangement of a stack with a compute chip and memory according to some implementations.

The illustrated example 600 depicts one example of a stack 602, having an arrangement of hardware components used in at least one variation in accordance with the described techniques. By way of example, the components of one or more of the first stack 104 or the second stack 104 are arranged like the stack 602 in the example 600. It is to be appreciated that components of stacks of a multi-stack package can be arranged in different ways without departing from the spirit or scope of the described techniques.

In the illustrated example 600, the stack 602 includes the compute chip 106, the memory 108, and circuitry die 604. In one or more implementations, the stack 602 or one or more components of the stack 602 (e.g., the circuitry die 604) are coupled to or otherwise integral with a substrate 606, an example of which is a system on chip (SOC) substrate. By way of example and not limitation, the substrate 606 corresponds to the multi-stack package 102.

Notably, the arrangement in the illustrated example 600 differs from the arrangement depicted in the side view of FIG. 1. In the system 100, the compute chip 106 and the memory 108 are arranged in a vertically stacked arrangement, e.g., the memory 108 is disposed "on top" of the compute chip 106. By way of contrast, in the example 600, the compute chip 106 and the memory 108 have a side-by-side arrangement, such that the memory 108 is arranged alongside the compute chip 106 rather than vertically on top of or below the compute chip 106. It is to be appreciated that in one or more implementations, different stacks of a multi-stack package include stacks having different arrangements of components, such as a first stack with an arrangement as depicted in FIG. 1 and a second stack with an arrangement as depicted in the example 600. In at least one variation, though, all the stacks have a same arrangement of components, e.g., all the stacks of a multi-stack package have an arrangement similar to the arrangement depicted in the illustrated example 600.

In the illustrated example 600, the circuitry die includes the memory request unit 112. In one or more implementations, the memory request unit 112 is implemented using a different and/or additional component from the circuitry die 604. The circuitry die 604 is configurable as and/or with any of a variety of semiconductor components, examples of which include but are not limited to memory controller, cache, data fabric, network on a chip (NoC), and memory interface circuits, to name just a few. In one or more implementations, the stack 602 includes multiple circuitry dies.

Although a single compute chip 106 and memory 108 are depicted in this example 600, in one or more variations, multiple layers of the compute chip 106 and memory 108 are stacked on the circuitry die 604, such that at least a second layer having a compute chip 106 and memory 108 is stacked on the first layer to form a "taller" stack.

FIG. 7 depicts a procedure in an example 700 implementation of multi-stack compute chip and memory architecture.

Data in a first memory is accessed for use by a compute chip (block 702). In accordance with the principles discussed herein, the first memory and the compute chip are coupled together to form a first stack of a multi-stack package. By way of example, data in the memory 108 of a first stack 104 of the multi-stack package 102 is accessed by a memory controller (not shown) of the first stack 104 for use by the compute chip 106 of the first stack 104. For instance, the data is accessed for use by the compute chip 106 to execute an instruction of an application, e.g., an operating system, a machine-learning-based task, and so forth.

Data in a second memory is accessed for use by the compute chip (block 704). In accordance with the principles discussed herein, the second memory is disposed in a second stack of the multi-stack package, and the second stack is communicably coupled to the first stack by one or more interconnects of the multi-stack package. By way of example, data in the memory 108 of a second stack 104 of the multi-stack package 102 is accessed by a memory controller (not shown) of the second stack 104 for use by the compute chip 106 of the first stack 104. In at least one variation, the data is communicated across an interconnect 110 from the second stack 104 to the first stack 104. The compute chip 106 of the first stack 104 then uses (e.g., processes) the data obtained from the memory 108 of the second stack 104. For instance, the compute chip 106 of the first stack 104 executes an instruction (e.g., of an application) in relation to the data obtained from the memory 108 of the first stack 104.

FIG. 8 depicts a procedure in an example 800 implementation of fabricating a multi-stack package.

A plurality of computing stacks is formed (block 802). In accordance with the principles herein, a first computing stack and a second computing stack of the plurality of computing stacks includes at least one compute chip and memory. By way of example, a plurality of stacks 104 is formed, and the plurality of stacks includes at least a first stack 104 and a second stack 104. In this example, the first stack 104 and the second stack 104 are each formed to include a compute chip 106 and memory 108. In one or more implementations, one or more of the stacks are formed by disposing a memory 108 on top of or below a compute chip 106 in a stacked arrangement, an example of which is depicted in FIG. 1. Alternatively or additionally, one or more of the stacks are formed by disposing a memory 108 in a side-by-side arrangement with a compute chip 106, an example of which is depicted in FIG. 6. The compute chip 106 and the memory 108 of a particular stack are electrically connectable to enable communication between those components in a variety of ways without departing from the spirit or scope of the described techniques, such as with through silicon vias or any of a variety of connections discussed above.

The plurality of computing stacks is disposed on a substrate (block 804). In accordance with the principles herein, the computing stacks are disposed on the substrate such that the first computing stack and the second computing stack are electrically connected on the substrate via one or more interconnects for sharing the memory. By way of example, the plurality of computing stacks, including a first computing stack 104 and a second computing stack 104, are disposed on a substrate, such as the substrate 606. The plurality of computing stacks are disposed in different topologies in variations, examples of which include but are not limited to the array topology, the 2D topology, the 3D topology, and the 4D topology of FIG. 5. On the substrate 606, the first computing stack 104 and the second computing stack 104 are electrically connected, such as via one or more of the interconnects 110. Across the interconnects 110, the first computing stack 104 and the second computing stack 104 communicate to share the respective memory 108, such as for use by the compute die 106 of the other stack, e.g., with NUMA characteristics.

It should be understood that many variations are possible based on the disclosure herein. Although features and elements are described above in particular combinations, each feature or element is usable alone without the other features and elements or in various combinations with or without other features and elements.

The various functional units illustrated in the figures and/or described herein (including, where appropriate, the multi-stack package 102, the multiple stacks 104, the compute chip 106, the memory 108, the interconnect 110, and the memory request unit 112) are implemented in any of a variety of different manners such as hardware circuitry, software or firmware executing on a programmable processor, or any combination of two or more of hardware, software, and firmware. The methods provided are implemented in any of a variety of devices, such as a general purpose computer, a processor, or a processor core. Suitable processors include, by way of example, a general purpose processor, a special purpose processor, a conventional processor, a digital signal processor (DSP), a graphics processing unit (GPU), a parallel accelerated processor, a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

In one or more implementations, the methods and procedures provided herein are implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. An apparatus comprising:
   a package including:
      a plurality of computing stacks integrated within the package, wherein a first computing stack and a second computing stack of the plurality of computing stacks each include at least one compute chip and memory, wherein the at least one compute chip is configured to access data in the memory of at least one of the first computing stack or the second computing stack to execute instructions of a program; and one or more interconnects of the package that couple the first computing stack to at least the second computing stack for sharing the memory.

2. The apparatus of claim 1, wherein the memory is one or more memory die.

3. The apparatus of claim 1, wherein the memory of the first computing stack includes dynamic random-access memory (DRAM) and the memory of the second computing stack includes non-volatile memory.

4. The apparatus of claim 1, wherein the memory of the first computing stack includes dynamic random-access memory (DRAM) and non-volatile memory.

5. The apparatus of claim 1, wherein the memory of the first computing stack includes a first portion and a second portion, wherein the first portion is embedded in the at least one compute chip, and wherein the second portion is separate from and communicably coupled to the at least one compute chip.

6. The apparatus of claim 1, wherein the first computing stack further includes one or more memory request units adapted to perform at least one of:

send and receive data over the one or more interconnects between the memory of the first computing stack and the second computing stack;

provide coherent shared memory across memory of the plurality of computing stacks; or provide coherent shared memory across memory of a subset of the plurality of computing stacks.

7. The apparatus of claim 1, wherein the at least one compute chip of the first computing stack is configured to access data from the memory of the first computing stack faster than data from the memory of the second computing stack, wherein the at least one compute chip of the first computing stack accesses the data from the memory of the second computing stack over the one or more interconnects.

8. The apparatus of claim 1, wherein the one or more interconnects are disposed on or within at least one of a silicon interposer, a silicon bridge, a glass interposer, an organic package, or a silicon photonic interconnect.

9. The apparatus of claim 1, wherein the plurality of computing stacks are interconnected with the one or more interconnects in an array topology.

10. The apparatus of claim 1, wherein the plurality of computing stacks are interconnected with the one or more interconnects in a grid topology.

11. The apparatus of claim 1, wherein the apparatus is communicably coupled to at least one additional package which includes a plurality of computing stacks.

12. The apparatus of claim 1, wherein the memory of the first computing stack is disposed in a stacked arrangement above or below the at least one compute chip of the first computing stack, and the stacked arrangement is disposed on a substrate of the apparatus.

13. The apparatus of claim 1, wherein the memory of the first computing stack is disposed in a side-by-side arrangement with the at least one compute chip of the first computing stack.

14. The apparatus of claim 13, wherein the side-by-side arrangement is disposed on a substrate of the apparatus.

15. The apparatus of claim 13, wherein the side-by-side arrangement is disposed in a stacked arrangement above or below a circuitry die of the first computing stack, and the stacked arrangement is disposed on a substrate of the apparatus.

16. The apparatus of claim 15, wherein the circuitry die includes at least one of:

a memory controller;

cache;

data fabric;

network on a chip (NoC); or memory interface circuits.

17. A system on package (SoP) comprising:

a plurality of computing stacks integral with a substrate of a package, wherein:

each computing stack of the plurality of computing stacks includes at least one compute chip coupled to one or more memory dies; and at least a first computing stack of the plurality of computing stacks is coupled to at least a second computing stack and a third computing stack of the plurality of computing stacks via interconnects for sharing the one or more memory dies, wherein the at least one compute chip is configured to access data in the one or more memory dies of at least one of the first computing stack or the second computing stack to execute instructions of a program; and one or more interfaces of the package to couple the package to at least one external device.

18. The system on package (SoP) of claim 17, wherein the at least one external device includes at least one of:

an integrated circuit;

external memory;

a motherboard; or an additional package.

19. A method for fabricating a multi-stack package comprising:

forming a plurality of computing stacks, wherein a first computing stack and a second computing stack of the plurality of computing stacks each include at least one compute chip and memory, wherein the at least one compute chip is configured to access data in the memory of at least one of the first computing stack or the second computing stack to execute instructions of a program; and disposing the plurality of computing stacks on a substrate of a package, the first computing stack and the second computing stack being electrically connected on the substrate via one or more interconnects for sharing the memory.

20. The apparatus of claim 1, wherein the plurality of computing stacks is integral with a substrate of the package.

21. The system on package (SoP) of claim 17, wherein the one or more memory dies of the first computing stack include dynamic random-access memory (DRAM) and the one or more memory dies of the second computing stack include non-volatile memory.

22. The system on package (SoP) of claim 17, wherein the one or more memory dies of the first computing stack include dynamic random-access memory (DRAM) and non-volatile memory.

23. The system on package (SoP) of claim 17, wherein the first computing stack includes embedded memory in the at least one compute chip.

24. The system on package (SoP) of claim 17, wherein the first computing stack includes one or more memory request units adapted to perform at least one of:

send and receive data over the interconnects between the one or more memory dies of the first computing stack and the one or more memory dies of the second computing stack;

provide coherent shared memory across the one or more memory dies of the plurality of computing stacks; or provide coherent shared memory across the one or more memory dies of a subset of the plurality of computing stacks.

25. The system on package (SoP) of claim 17, wherein the at least one compute chip of the first computing stack is configured to access data from the one or more memory dies of the first computing stack faster than data from the one or more memory dies of the second computing stack, wherein the at least one compute chip of the first computing stack accesses the data from the one or more memory dies of the second computing stack over the interconnects.

26. The system on package (SoP) of claim 17, wherein the plurality of computing stacks are interconnected with the interconnects in an array topology.

27. The system on package (SoP) of claim 17, wherein the plurality of computing stacks are interconnected with the interconnects in a grid topology.

28. The system on package (SoP) of claim 17, wherein the one or more memory dies of the first computing stack are disposed in a stacked arrangement above or below the at least one compute chip of the first computing stack, and the stacked arrangement is disposed on the substrate of the package.

29. The system on package (SoP) of claim 17, wherein the one or more memory dies of the first computing stack are disposed in a side-by-side arrangement with the at least one compute chip of the first computing stack.

30. The system on package (SoP) of claim 29, wherein the side-by-side arrangement is disposed on the substrate of the package.

31. The system on package (SoP) of claim 29, wherein the side-by-side arrangement is disposed in a stacked arrangement above or below a circuitry die of the first computing stack, and the stacked arrangement is disposed on the substrate of the package.

32. The system on package (SoP) of claim 31, wherein the circuitry die includes at least one of:

a memory controller;

cache;

data fabric;

network on a chip (NoC); or memory interface circuits.

33. The method of claim 19, wherein the memory is one or more memory dies.

34. The method of claim 19, wherein the memory of the first computing stack is formed to include dynamic random-access memory (DRAM) and the memory of the second computing stack is formed to include non-volatile memory.

35. The method of claim 19, wherein the memory of the first computing stack is formed to include dynamic random-access memory (DRAM) and non-volatile memory.

36. The method of claim 19, wherein the memory of the first computing stack is formed to include a first portion and a second portion, wherein the first portion is embedded in the at least one compute chip, and wherein the second portion is separate from and communicably coupled to the at least one compute chip.

37. The method of claim 19, wherein the first computing stack is formed to include one or more memory request units adapted to perform at least one of send and receive data over the one or more interconnects between the memory of the first computing stack and the second computing stack;

provide coherent shared memory across memory of the plurality of computing stacks; or provide coherent shared memory across memory of a subset of the plurality of computing stacks.

38. The method of claim 19, wherein the at least one compute chip of the first computing stack is configured to access data from the memory of the first computing stack faster than data from the memory of the second computing stack, wherein the at least one compute chip of the first computing stack accesses the data from the memory of the second computing stack over the one or more interconnects.

39. The method of claim 19, further comprising disposing the one or more interconnects on or within at least one of a silicon interposer, a silicon bridge, a glass interposer, an organic package, or a silicon photonic interconnect.

40. The method of claim 19, further comprising coupling the plurality of computing stacks with the one or more interconnects in an array topology.

41. The method of claim 19, further comprising coupling the plurality of computing stacks with the one or more interconnects in a grid topology.

42. The method of claim 19, further comprising disposing the memory of the first computing stack in a stacked arrangement above or below the at least one compute chip of the first computing stack, and disposing the stacked arrangement on a substrate of the multi-stack package.

43. The method of claim 19, further comprising disposing the memory of the first computing stack in a side-by-side arrangement with the at least one compute chip of the first computing stack.

44. The method of claim 43, further comprising disposing the side-by-side arrangement on a substrate of the multi-stack package.

45. The method of claim 43, further comprising disposing the side-by-side arrangement in a stacked arrangement above or below a circuitry die of the first computing stack, and disposing the stacked arrangement on a substrate of the multi-stack package.

46. The method of claim 45, wherein the circuitry die includes at least one of:

a memory controller;

cache;

data fabric;

network on a chip (NoC); or memory interface circuits.

* * * * *